United States Patent
Karame et al.

(10) Patent No.: US 10,785,167 B2
(45) Date of Patent: Sep. 22, 2020

(54) METHOD FOR CONTROLLING ACCESS TO A SHARED RESOURCE

(71) Applicant: NEC Laboratories Europe GmbH, Heidelberg (DE)

(72) Inventors: Ghassan Karame, Heidelberg (DE); Damian Gruber, Zurich (CH); Hubert Ritzdorf, Zurich (CH); Srdjan Capkun, Zurich (CH)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/320,114

(22) PCT Filed: Jul. 26, 2016

(86) PCT No.: PCT/EP2016/067793
§ 371 (c)(1),
(2) Date: Jan. 24, 2019

(87) PCT Pub. No.: WO2018/019364
PCT Pub. Date: Feb. 1, 2018

(65) Prior Publication Data
US 2019/0268284 A1    Aug. 29, 2019

(51) Int. Cl.
*H04L 12/911*  (2013.01)
*H04L 9/32*  (2006.01)
(Continued)

(52) U.S. Cl.
CPC .......... *H04L 47/828* (2013.01); *G06F 21/604* (2013.01); *G06F 21/62* (2013.01);
(Continued)

(58) Field of Classification Search
CPC ............... H04L 2209/38; H04L 9/3239; H04L 2209/56; H04L 9/3242; H04L 9/14;
(Continued)

(56) References Cited

U.S. PATENT DOCUMENTS

| | | | |
|---|---|---|---|
| 7,845,000 B2 * | 11/2010 | Viger | H04L 63/10 726/3 |
| 9,129,095 B1 * | 9/2015 | Lam | G06F 21/6218 |

(Continued)

OTHER PUBLICATIONS

Jason Paul Cruz et al., "The Bitcoin Network as Platform for Trans-Organizational Attribute Authentication", WEB 2015—The Third International Conference on Building and Exploring Web Based Environments, May 24, 2015 (May 24, 2015), XP055239598.

(Continued)

*Primary Examiner* — Sargon N Nano
(74) *Attorney, Agent, or Firm* — Leydig, Voit & Mayer, Ltd.

(57) ABSTRACT

A method for controlling access to a shared resource for a plurality of collaborative users includes securely providing, on a storage and device entity, the shared resource. The shared resource is created by a resource owner entity. The method further includes specifying access control rules for the shared resource, translating the access control rules into a smart contract, including the smart contract into a blockchain, and if a second user requests access to the shared resource, performing access decisions for the shared resource by evaluating the smart contract with regard to the access control rules.

20 Claims, 5 Drawing Sheets

(51) Int. Cl.
  *G06F 21/62* (2013.01)
  *G06F 21/60* (2013.01)

(52) U.S. Cl.
  CPC .... *H04L 9/3236* (2013.01); *G06F 2221/2141* (2013.01); *G06F 2221/2147* (2013.01); *H04L 2209/38* (2013.01)

(58) Field of Classification Search
  CPC ..... H04L 63/10; H04L 63/0442; H04L 63/20; H04L 9/3265; H04L 63/0884; H04L 9/006; H04L 9/321; H04L 9/3247; H04L 9/3236; H04L 9/3297; H04L 9/30; H04L 63/12; H04L 47/828; G06Q 20/02; G06Q 20/405; G06Q 20/381; G06F 21/602; G06F 21/645; G06F 2221/2141; G06F 21/62; H04N 2201/3233
  See application file for complete search history.

(56) References Cited

U.S. PATENT DOCUMENTS

| | | | | |
|---|---|---|---|---|
| 9,569,771 | B2* | 2/2017 | Lesavich | G06Q 20/382 |
| 9,601,217 | B1* | 3/2017 | Karakozova | G11C 29/52 |
| 10,346,406 | B2* | 7/2019 | Booz | H04W 12/10 |
| 2002/0133678 | A1* | 9/2002 | Mathews | G06F 9/5016 |
| | | | | 711/153 |
| 2009/0254749 | A1* | 10/2009 | Li | G06F 21/34 |
| | | | | 713/169 |
| 2013/0061035 | A1* | 3/2013 | Hook | G06F 21/62 |
| | | | | 713/150 |
| 2016/0162897 | A1* | 6/2016 | Feeney | G06Q 20/065 |
| | | | | 705/71 |
| 2016/0261411 | A1* | 9/2016 | Yau | G06F 21/445 |
| 2016/0292672 | A1* | 10/2016 | Fay | G06Q 20/363 |
| 2017/0005804 | A1* | 1/2017 | Zinder | H04L 9/3247 |
| 2017/0103468 | A1* | 4/2017 | Orsini | G07F 15/003 |
| 2017/0132619 | A1* | 5/2017 | Miller | H04L 9/3236 |
| 2017/0132620 | A1* | 5/2017 | Miller | H04L 9/30 |
| 2017/0193464 | A1* | 7/2017 | Sher | H04L 9/0637 |
| 2018/0006982 | A1* | 1/2018 | Costello | H04L 51/04 |
| 2018/0189312 | A1* | 7/2018 | Alas | G06F 21/64 |
| 2020/0019288 | A1* | 1/2020 | D'Amore | G06F 3/0484 |

OTHER PUBLICATIONS

Fan Zhang, et al., "Town Crier: An Authenticated Data Feed for Smart Contracts", CCS '16 Proceedings of the 2016 ACM SIGSAC Conference on Computer and Communications Security, Oct. 24-28, 2016, pp. 270-282.

"Welcome to Virtual-Notary—a free and secure electronic attestation service", Virtual-Notary: Notarize the intangible, Jul. 1, 2016, pp. 1-2.

Yongdae Kim, et al., "Simple and Fault-Tolerant Key Agreement for Dynamic Collaborative Groups", CCS '00 Proceedings of the $7^{th}$ ACM conference eon Computer and Communications Security, Nov. 1-4, 2000, pp. 235-244.

Yongdae Kim, "Tree-based Group Key Arrangement", ACM Transactions on Information and System Security, vol. 7, No. 1, Feb. 2004, pp. 60-96.

Mike Burmester, et al., "A Secure and Efficient Conference Key Distribution System", Advances in Cryptology—EUROCRYPT'94, May 23, 2006, pp. 275-286.

Claudio Soriente, et al., "Commune: Shared Ownership in an Agnostic Cloud", arXiv:1311.6236v1 [cs.CR], Nov. 25, 2013, pp. 1-14.

Guy Zyskind, et al., "Decentralizing Privacy: Using Blockchain to Protect Personal Data", 2015 IEEE Security and Privacy Workshops, May 22, 2015 (May 22, 2015), pp. 180-184, XP055359413.

Xu, Xiwei et al. "The Blockchain as a Software Connector," May 25, 2016, XP055275506.

* cited by examiner

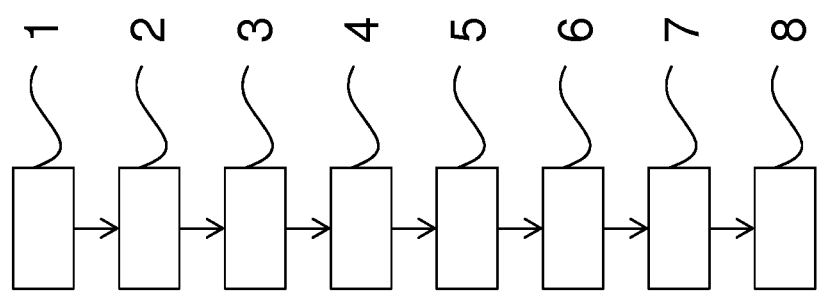

METHOD FOR CONTROLLING ACCESS TO A SHARED RESOURCE

CROSS REFERENCE TO RELATED APPLICATIONS

This application is a U.S. National Stage Application under 35 U.S.C. § 371 of International Application No. PCT/EP2016/067793 filed on Jul. 26, 2016. The International Application was published in English on Feb. 1, 2018, as WO 2018/019364 A1 under PCT Article 21(2).

FIELD

The present invention relates to a method for controlling access to a shared resource for a plurality of collaborative users, to a system for controlling access to a shared resource for a plurality of collaborative users, to a blockchain computing entity adapted to compute a blockchain, to a non-transitory computer readable medium storing a program causing a computer to execute a method for controlling access to a shared resource for a plurality of collaborative users, and to a non-transitory computer readable medium storing a program causing a computer to execute a method for operating a blockchain computing entity.

BACKGROUND

Secure and reliable group communication is an increasingly active area by growing popularity in group-oriented and collaborative application. Centralized management of keys is often used in multicast-style groups. However collaborative group settings usually require a distributed key management for which communication and computation cost are important factors when managing group keys.

SUMMARY

In an embodiment, the present invention provides a method for controlling access to a shared resource for a plurality of collaborative users. The method includes securely providing, on a storage and device entity, the shared resource. The shared resource is created by a resource owner entity. The method further includes specifying access control rules for the shared resource, translating the access control rules into a smart contract, including the smart contract into a blockchain, and if a second user requests access to the shared resource, performing access decisions for the shared resource by evaluating the smart contract with regard to the access control rules.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5 shows steps of a method according to a further embodiment of the present invention.

DETAILED DESCRIPTION

Figure 1:
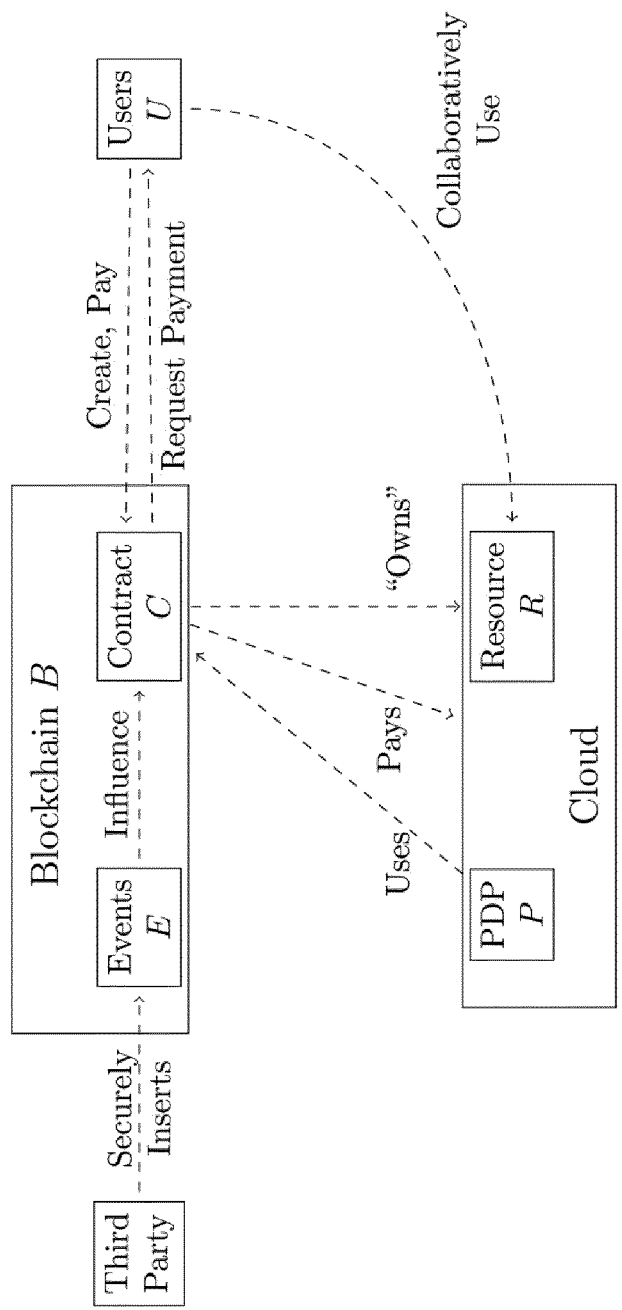
FIG. 1 shows a system according to an embodiment of the present invention.

Embodiments of the present invention provide a secure and efficient group key management, a flexible while publicly verifiable access control, and security of resources which are publicly available.

Although applicable to any kind of a shared resource scenario, the present invention will be described with regard to a cloud platform hosting a shared resource. Although applicable to any kind of access for users the present invention will be described with regard to a group access for a shared resource for a plurality of users.

In an embodiment the present invention provides a method for controlling access to a shared resource for a plurality of collaborative users, wherein a resource created by a first user entity—resource owner entity—is securely provided on a storage and device entity, and wherein access control rules are specified for said created resource, and wherein said access control rules are translated into a smart contract, said smart contract being included into a blockchain, and wherein if a second user requests access to said resource, access decisions for said resource are performed by evaluating the smart contract with regard to the included access control rules.

In a further embodiment the present invention provides a system for controlling access to a shared resource, comprising a plurality of user entities for users for accessing said shared resource, a storage and service entity providing one or more resources, and a blockchain entity for computing a blockchain, wherein a resource created by a first user entity—resource owner entity—is securely provided on said storage and service entity, and wherein access control rules are specified for said created resource, and wherein said access control rules are translated into a smart contract, said smart contract being included into a blockchain computed by said blockchain entity, and wherein if a second user requests access to said resource, access decisions for said resource are performed by the storage and service entity by evaluating the smart contract hosted within the blockchain with regard to the included access control rules.

In a further embodiment the present invention provides a blockchain computing entity, adapted to compute a blockchain, wherein in said blockchain a smart contract is included, said smart contract comprising translated access control rules specifying access rights for a resource securely provided on a storage and service entity.

In a further embodiment the present invention provides a non-transitory computer readable medium storing a program causing a computer to execute a method for controlling access to a shared resource for a plurality of collaborative users, wherein a resource created by a first user entity—resource owner entity—is securely provided on a storage and device entity, and wherein access control rules are specified for said created resource, and wherein said access control rules are translated into a smart contract, said smart contract being included into a blockchain, and wherein if a second user requests access to said resource, access decisions for said resource are performed by evaluating the smart contract with regard to the included access control rules.

In an even further embodiment the present invention provides a non-transitory computer readable medium storing a program causing a computer to execute a method for operating a blockchain computing entity, wherein said blockchain computing entity is adapted to compute a blockchain, wherein in said blockchain a smart contract is included, said smart contract comprising translated access control rules specifying access rights for a resource securely provided on a storage and service entity.

The term "computer readable medium" may refer to any kind of medium, which can be used together with a computation device or computer and on which information can be stored. Said information may be any kind of data which can be read into a memory of a computer. For example said information may include program code for executing with said computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM. EEPROM or the like.

The terms "entity" and "storage and service entity" refer in particular in the claims, preferably in the specification each to a device adapted to perform computing like a personal computer, a tablet, a mobile phone, a server, or the like and comprises one or more processors having one or more cores and may be connectable to a memory for storing one or more applications which is/are adapted to perform corresponding steps of one or more of the embodiments of the present invention. Any application may be software-based and/or hardware-based installed in the memory on which the processor(s) can work on. The devices, entities or the like may be adapted in such a way that the corresponding steps to be computed are performed in an optimized way. For instance different steps may be performed in parallel with a single processor on different of its cores. Further the entity and storage and service entity may be identical forming a single computing device. The device or devices may also be instantiated as a virtual device running on a physical computing resource. Different devices may therefore be executed on said physical computing resource.

The term "tree structure" or a "tree" refers in particular in the claims, preferably in the specification to an abstract data type or data structure implementing the abstract data type simulating a hierarchical tree structure, with a root value and subtrees of children with a parent node, represented as a set of linked nodes. A tree data structure can be defined recursively (locally) as a collection of nodes—starting at a root node —, where each node is a data structure consisting of a value, together with a list of references to nodes—the "child nodes"—, with the constraints that no reference is duplicated, and none points to the root. Some of the nodes in the tree structure may refer to physical or virtual entities or users or the like.

The term "smart contract" is to be understood in its broadest sense and refers in particular in the claims, preferably in the specification to a computer protocol facilitating, verifying and/or enforcing a negotiation or performance of a contract or making a contractual clause unnecessary, wherein smart contracts may have a user interface and may emulate a logic of contractual clauses.

The term "blockchain" refers in particular in the claims, preferably in the specification to a distributed database maintaining a continuously growing list of data records hardened against tampering and revision. A blockchain may comprise data structure blocks that hold time stamp badges of valid transactions, wherein each block may include the hash value of a prior block linking the blocks together.

The term "resource" is to be understood in its broadest sense and refers in particular in the claims, preferably in the specification to any kind of information, data, application, physical device or entity, virtual device or entity or the like.

The term "event" is to be understood in its broadest sense and refers in particular in the claims, preferably in the specification to any kind of incident, occasion, happening, act or the like, which can be verified. The term "event information" represents information, data, etc. encoded into a machine-readable format of an event.

The term "external" with regard to or in connection with the term "event" refers in particular in the claims, preferably in the specification to any kind of an event outside the underlying computational system, device, entity or the like. For instance, an external event may be—but is not limited to—weather conditions like sunshine at 9:00 o'clock or temperature above 20 degrees Celsius or the like or news, etc.

The term "party" is to be understood in its broadest sense and refers in particular in the claims, preferably in the specification to any kind of person, entity, institution, enterprise, company, user, group of users or entities or devices operated by a person, entity, institution, enterprise, company, user, group of users.

The term "third" with regard to or in connection with the term "party" refers in particular in the claims, preferably in the specification to any kind of party outside the scope, structure or the like of the underlying computational system, device, entity or the like.

Embodiments of the present invention may have at least one of the following advantages:

Decentralized access control for example in a cloud using blockchain.

Flexible access control scheme.

Decisions for access control being publicly verifiable.

Security of the data ensured.

Distributed access control in the cloud while relying on smart contracts like Turing complete smart contracts.

Event information provided by a third party specifying one or more events are included into the smart contract, wherein said event information may be directly included into said blockchain. This enhances the flexibility since external events like real world events in form of weather conditions, e.g. temperature, exchange courses, stock prices, etc. or in general news, is included. Further more complex access control decisions can be provided. The real world events may be securely inserted into the blockchain. This may be provided by TownCrier as disclosed in the non-patent literature of Fan Zhang, Ethan Cecchetti, Kyle Croman, Ari Juels, and Elaine Shi, "Town crier: An authenticated data feed for smart contracts", Cryptology ePrint Archive, Report 2016/168, 2016, http://eprint.iacr.org/2016/168, or Virtual Notary as described in the non patent literature of Cornell University, Virtual-notary—a free and secure electronic attestation services, 2016, http://virtual-notary.org/, or through consensus by sufficiently many nodes.

In detail examples of such events may be the following:

In a collaboration between multiple companies, employees of company A lose access rights once A's stock price falls below a threshold indicating a potential bankruptcy and therefore a loss of trust.

In a collaboration between multiple companies, employees of company A lose access rights once A gets bought up by another company or individual, i.e. the legal framework and trust relations change.

An employee loses access rights once a search warrant has been issues for this employee.

A hotel front door allows access to the lobby to anyone even at night if a hurricane warning has been issued for the area.

For providing group access to said resource a group secret between users of a defined group may be generated by:
a) Generating a tree-based group information by a first user of said group, as root of an underlying tree-structure comprising nodes,
b) Integrating said tree-based group information of said first user into said smart contract of said resource,
c) Downloading the current root node, uploading tree-based group information of one or more subsequent users of said defined group and generating an updated root node,
d) Generating said group secret based on the completely updated information of the root node.

This enables in an easy and reliable way to generate the group secret. For example a tree-based group Diffie-Hellman TGDH as disclosed in the non-patent literature of Yongdae Kim, Adrian Perrig, and Gene Tsudik, "Simple and fault-tolerant key agreement for dynamic collaborate groups", in Proceedings of the $7^{th}$ ACM conference on Computer and communications security, pages 235-244, ACM, 2000, or in the non-patent literature of Yongdae Kim, Adrian Perrig, and Gene Tsudik, "Tree-based group key arrangement", ACM Trans. Inf. Syst. Secur., 7(1):60-96, February 2004, may perform group key agreement via Diffie-Hellman in a balanced binary tree, wherein each leaf node is associated with a group member. The inner node represents the key for the connected leaves and the route node comprises the group key.

Said tree structure may be an unbalanced binary tree. This enables fast join operations and thus, enhance the overall usability of the tree while having the storage complexity similar or better compared with other conventional methods.

Access permissions given to a node in said tree may be also applied for all child nodes of said node. In other words if a permission is given to a node in a hierarchy the permission holds for all nodes in the subtree with said node as root, i.e. for all child nodes. This enables to reduce the storage requirements in the blockchain and thus the efficiency.

Vote information specifying a number of votes required for making valid access decisions may be included into the smart contract. This allows for example owners of a resource to vote on access rights for certain roles. Thus, flexibility is enhanced. Furthermore, members of a role can vote on the role membership of other users. This means that users can be added to and removed from a role. Another example is that owners can decide to revoke owner's privileges from one of them.

One or more dynamic and/or fixed thresholds for voting operations may be specified during smart contract creation. This enhances the flexibility while enabling a fast decision on voting operations by agreeing to said thresholds.

An owner contract may specify at least user identification information and group membership information, wherein said group membership information may be provided in form of an array of bitmasks. This allows in an easy and reliable way to provide an owner contract with the necessary information.

Owner contracts and shared repository contracts of a cloud service entity may be included into said smart contract. For example the cloud contract may be held by a cloud service provider providing a cloud interface for owner contracts. The cloud service provider then may query the owner contract in order to decide if a user should be granted access to a resource, for example a file, or not.

The smart contracts may be based on role-based access control RBAC. Role-based access control enhances the flexibility and efficiency in terms of required storage inside the blockchain.

Blockchain may be hosted by a cloud service and storage entity. This enables in an easy way to provide a hosting of the blockchain in a data center offering cloud services.

Users may be authenticated directly through the blockchain. This enhances the reliability by providing an easy user authentication.

There are several ways how to design and further develop the teaching of the present invention in an advantageous way. To this end it is to be referred to the patent claims subordinate to the independent claims on the one hand and to the following explanation of further embodiments of the invention by way of example, illustrated by the figure on the other hand. In connection with the explanation of the further embodiments of the invention by the aid of the figure, generally further embodiments and further developments of the teaching will be explained.

FIG. 1 shows a system according to an embodiment of the present invention. In FIG. 1 a system according to the present invention is shown. A plurality of users U each having for example a computing device would like to collaboratively use a resource R hosted within the cloud with the goal to ensure fair access to said shared cloud-based resource. The users U do not have other communication channels other than the blockchain B and its smart contracts C. A policy decision points PDP P of the cloud is blockchain aware, that means, it performs access control decisions based on the results of smart contracts C. These smart contracts "own" the shared cloud-based resource. All inputs are public as required by the blockchain and so access control decisions become publicly verifiable. For example the smart contracts may offer a standardized interface for access control decisions, for example isAllowed (resource, user, action). To evaluate access control decisions the cloud platform runs a blockchain node, which may be a node adapted to compute part of a blockchain or a full blockchain, and evaluates access control decisions based on its local blockchain state.

For instance template contracts that use Role-based Access Control—RBAC—enable great flexibility and efficiency in terms of required storage inside the blockchain. User authentication can be performed directly through the blockchain, as the blockchain can link accounts to identity keys. Based on such keys, further keys such as group keys can be derived. Finally the smart contracts C ensure fairness in terms of accounting, by billing involved parties U in relation to their usage and the agreed payment policy. If parties U do not pay their fair share, the contracts can e.g. partially revoke their access rights in order to enforce fair payment. Overall this system allows fair access control and accounting. Further real-world events E are securely inserted into the blockchain B. This can happen through systems such as TownCrier as disclosed in the non-patent literate of Fan Zhang, Ethan Cecchetti, Kyle Croman, Ari Juels, and Elaine Shi, "Town crier: An authenticated data feed for smart contracts", Cryptology ePrint Archive, Report 2016/168, 2016, http://eprint.iacr.org/2016/168 or Virtual Notary as disclosed in the non-patent literature of Cornell University, Virtual-notary—a free and secure electronic attestation services, 2016, http://virtual-notary.org/ or through consensus by sufficiently many nodes.

Based on these events E complex access control decisions can be made. Such decisions can be based on stock prices, weather conditions or exchange courses or any other kind of external events as described above, e.g. in a collaboration between multiple companies, employees of company A lose access rights once A's stock price falls below a threshold indicating a potential bankruptcy and therefore a loss of trust.

Figure 2:
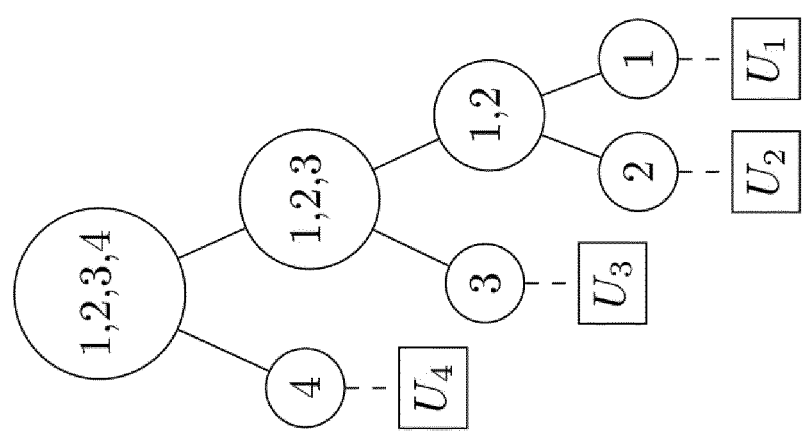
FIG. 2 shows part of a method according to a further embodiment of the present invention.

FIG. 2 shows part of a method according to a further embodiment of the present invention. In FIG. 2 a key tree for use in blockchain is shown. The user $U_1, \ldots, U_4$ agree on a group key. Circular nodes describing the public value saved in the blockchain. The indices inside the nodes denote the users $U_1, \ldots, U_4$ with knowledge of the corresponding secret key.

The blockchain is completely public. Many conventional cloud-based services benefit from a shared secret between the collaborating users that can be renewed once users join or leave. As storage in the blockchain is very expensive, using efficient schemes enable a cost reduction for such use cases.

Conventional schemes such as the Broadcast System as disclosed in the non-patent literature of M. Burmester and Y. Desmedt, "A secure and efficient conference key distribution system." In Advances in cryptology—Eurocrypt '94, pages 275-286, Springer 1994 require each participant to store two values on the central storage, in our case the blockchain. Their storage complexity is therefore $\theta$ (2*n) for n participating users.

In an embodiment the present invention uses Tree-Based Group Diffie-Hellman (TGDH) as disclosed in the non-patent literature of Y. Kim, A. Perrig and G. Tsudik, "Simple and fault-tolerant key agreement for dynamic collaborative groups", in Proceedings of the $7^{th}$ ACM conference on Computer and communications security, pages 235-244, ACM, 2000 and in the non-patent literature of Y. Kim, A. Perrig and G. Tsudik, "Tree-based group key agreement", ACM Trans. Inf. Sys. Secur. 7(1):60-96, February 2004 performing group key agreement by applying Diffie-Hellman in a balanced binary tree. Each leaf node is associated with a group member. The inner node represents the key for the connected leafs, and the root node contains the group key. In a full tree the storage complexity is therefore $\theta(2*n-1)$. However, join or leave operations require the cooperation of a specific member.

In a further embodiment the present invention provides unbalanced Tree-Based Group Diffie-Hellman, as seen in FIG. 2. This enables fast join operations to enhance overall usability and provides a storage complexity of $\theta$ (2*n-1) which is similar or better compared to conventional methods.

More precisely the generation of the group secret works as follows:
1. The first user U generates their Diffie-Hellman contribution and uploads it into the storage of the contract. The contract makes sure only authenticated users can participate.
2. Subsequent users U download the current root node and upload their Diffie-Hellman contributions. A new root node is generated.
3. Finally all users catch up by computing the group key based on the uploaded public parts.

Group joins work as follows:
1. The joining user U downloads the current root node, uploads its Diffie-Hellman contribution and generates a new root node.
2. All other users U can compute the updated group key based on the new Diffie-Hellman contribution of the joining user.

This group join method enables backward secrecy as the joining user U learns nothing about the previous group key. Once the group key is established, it can then be used e.g. to bootstrap all kinds of systems that require a shared cryptographic secret. Examples for such systems include encrypted file sharing and secure multicast protocols.

Embodiments of the present invention not only provide flexible access control, they provide flexible, contract-controlled accounting. In such accounting, different strategies are possible: In general the smart contract can have user-specific deposits out of which it pays the current bills. If users fail to refill their deposits in due time they can be punished in several ways. After some defined time, access control rights can be (partially) revoked in order to encourage the user U to refill its deposit. Accounting strategies can be as follows: These strategies are agreed upon by the parties before the contract creation. As a simple option, all users U pay equally. However, as the contract interacts with the cloud platform, it can receive usage information by the platform and also factor in outside events to determine a more complex accounting strategy. For example, user U with more intensive usage might have to pay more, as they incurred additional costs. This would lead to a payment proportional to usage. Furthermore, certain kind of user behaviour could be rewarded or punished, e.g. providing valuable content to a collaboration could be rewarded, while missing agreed upon deadlines could be punished.

In an embodiment, if users U collaborate on cloud storage, the users U could pay according to their number of storage operations.

Figure 3:
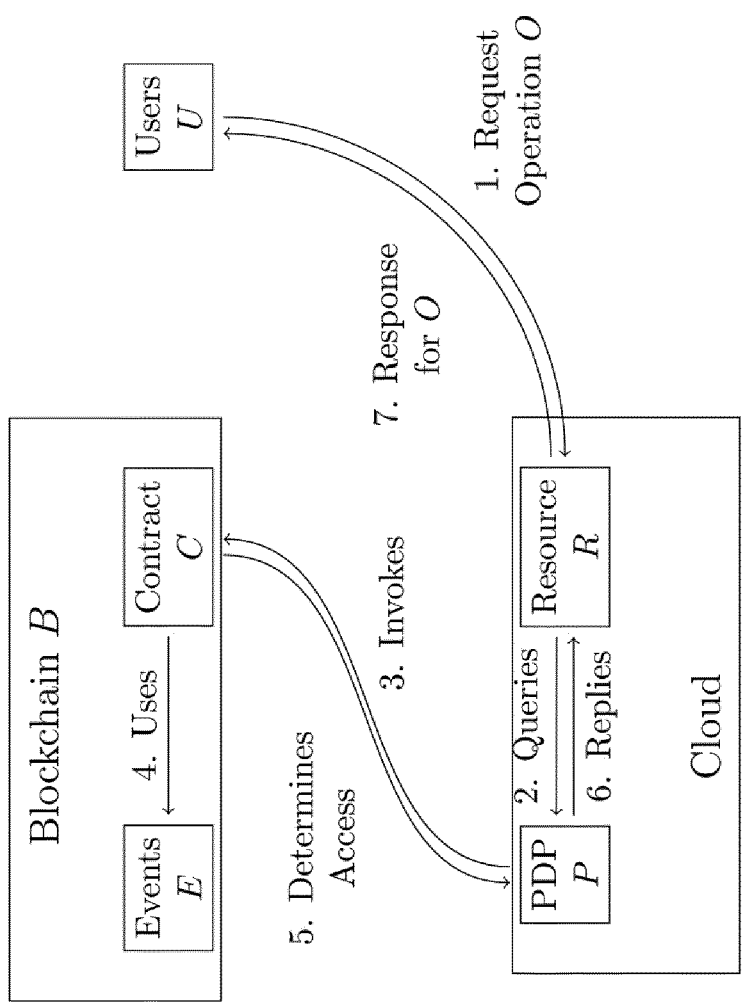
FIG. 3 shows steps of a method according to a further embodiment of the present invention.

FIG. 3 shows steps of a method according to a further embodiment of the present invention. In FIG. 3 steps of an underlying protocol are shown, wherein the user requests access to a cloud resource R. The cloud resource R queries then the PDP P which invokes the contract C.

In detail: The involved parties are the users U, the blockchain B, the contract C, the cloud resource R and the cloud PDP P. Initially the users U agree on a (smart) contract C. The contract fixes the access control policy, the considered outside events E and accounting strategy. Additionally, all users U pay their initial deposit to C. If user $U_i$ wants to access the cloud resource R, $U_i$ sends a request to the cloud resource R to perform a certain operation O. The cloud resource R forwards the request to the PDP P. P invokes the contract C according to a standardized interface.

Therefore, the PDP P specifies the cloud resource R, the user $U_i$ and the operation O and evaluates the contract C. The contract C can internally depend on outside events from E and the state of the blockchain. Depending on the evaluation of the contract C the operation O is either permitted or not. This procedure is depicted in FIG. 3. If a privileged user $U_j$ wishes to influence future evaluations of the contract C, $U_j$ can introduce specific events E, that might alter the contract decision. For example, the user $U_j$ can submit a vote to grant or revoke certain access rights. After a billing period, the cloud issues the contract C to pay for its resource usage. The contract C pays to the cloud and then informs the users U how much they have to pay according to the predefined accounting strategy. The users simply pay to the contract C. If the users fail to pay, the contract C can revoke their access rights.

Figure 4:
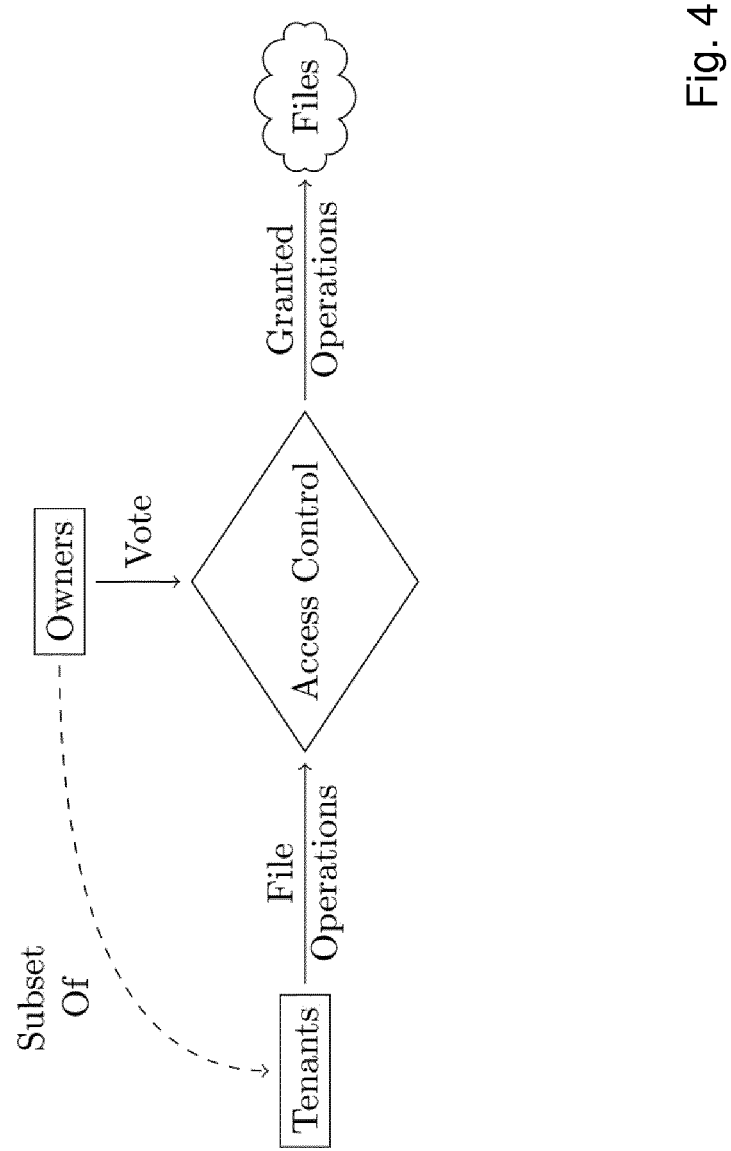
FIG. 4 shows steps of a method according to a further embodiment of the present invention.

FIG. 4 shows steps of a method according to a further embodiment of the present invention. In FIG. 4 an example for shared ownership in the cloud is shown. The subset of tenants, i.e. users, votes to jointly make access control decisions on shared files.

Shared Ownership as e.g. disclosed in the non-patent literature of C. Soriente, G. O. Karame, H. Ritzdorf, S. Marinovic and S. Capkun: "*Commune*: Shared ownership in an agnostic cloud", In proceedings of the 20th ACM Symposium on Access Control Models and technologies, SACMAT '15, pages 39-50, New York, N.Y., USA, 2015, ACM is an example for a complex access control policy, based on current events, i.e. the owners' votes the so-called shared ownership access control model (SOM). In SOM, certain tenants become owners. These owners have to approve every file operation. An operation is approved if at least t owners support it. As cloud platforms allow collaboration on files, they should also allow collaborative access control decisions on these files. In contrast, if just one tenant hosts the collaboration account, this tenant is the sole data owner who unilaterally makes access control decisions. A shared ownership may have two advantages: First, a sole owner can abuse his rights by unilaterally making access control decisions, e.g. a malicious user revokes access to shared files from other collaborators. Second, even if tenants are willing to elect and trust one of them to make access control decisions, the elected owner may not want to be held accountable for collecting and correctly evaluating other tenants' policies. For example, incorrect evaluations may incur a negative reputation or financial penalties.

In an embodiment of the present invention a Cloud Contract CC and a set of Owner Contracts OCs are used. The cloud contract CC is held by the cloud service provider. It provides the cloud interface for the owner contracts OC. The cloud service provider queries the owner contract OC in order to decide, if a user should be granted access to a file, or not. This enables a cheap, off-blockchain storage with Ethereum smart contracts allowing access to cloud services to be managed through smart contracts.

The owners have full read/write access. They also vote on all access control decisions. When using RBAC, they vote on the access rights for certain roles. Furthermore, the members of a role can vote on the role membership of other users. This means that users can the added to and removed from a role. In the same way, the owners can decide to revoke owner's privileges from one of them. For all these voting operations, dynamic or fixed thresholds can be agreed upon during contract creation.

When considering a hierarchical service model this provides when a permission is given to node n in a file hierarchy, the permission holding for all nodes in the subtree with node n as root (i.e. all child nodes). This enables a higher efficiency and a reduction in storage requirements in the blockchain.

Both the cloud provider and the owner contract OC interact with the cloud contract CC. Files and directories are e.g. identified based on a unique nodeId.

The following functions may be called by an OC via an appropriate suitable interface:
  registerOwnerContract( ): An owner contract registers itself. The cloud storage internally creates a repository.
  deregisterOwnerContract( ): The owner contract deregisters itself. The service will not be provided anymore.
  getBill( ): An owner contract can query the amount of Ether to be paid for the next billing period.
  payBill(value): An owner contract can pay its bill.

The Owner Contract OC may define a user to have a userId, a balance, and an array of bitmasks called groupMemberships. At index i, the bitmask of owners that granted the user membership of group i is stored. Finally, each user comprises a bitmask called ownerVotes, which describes which owners voted for this user to become an owner.

Files in the file hierarchy have an associated node in the permissionTree. Each node contains a unique nodeId, and a mapping, from user groups to arrays of bitmasks, called permissions. At permissions[groupId][i], the bitmask representing the owners that granted right i to group groupId is defined.

To allow owners to provide certain definitions for the owner contract the following functions may be provided by an API:
  createOwnerContract (ownerAddress, cloudContractAddress, suicideAddress):
  Calls registerOwnerContract( ), and registers the owners of the repository.
  owners: An array of owners.
  addOwner(userAddress): The sender (has to be an owner) votes for the given user to become an owner. If the amount of votes that the user receives is at least OwnerThreshold( ), the user is added to owners. The new owner directly votes for all owners (including himself).
  removeOwner(userAddress): The sender (has to be an owner) revokes his vote for the given user. If the user has been an owner before, and does now not have sufficient votes any more, he loses the status as an owner. All the votes issued by this user become invalid. This is achieved by removing the user from owners. Other owners, which lose a vote, may also lose their owner status. This results in a recursive process.
  addUser(userAddress): The sender (has to be an owner) registers a new user. Users start with no rights at all, as they need to be assigned to user groups in order to get permissions.
  grantMembership(userAddress, groupId): The sender (has to be an owner) votes for the given user to become a member of the given group.
  revokeMembership(userAddress, groupId): The sender (has to be an owner) revokes his vote for the given user.
  grantPermission(groupId, permission, nodeId): The sender (has to be an owner) grants the given permission to the given group, specific to the indicated node. If the node does not yet exist in the permission tree, it is created. Then, the bitmask corresponding to the permission in the given group is updated. Specifically, the bit of the sender is set to one.
  revokePermission(groupId, nodeId, permission): The sender (has to be an owner) revokes his vote.
  payBill(value): An owner can invoke this function to pay the owner contract's bill. The bill is evenly distributed among all users (including owners). This function succeeds, if the balance of each user is at least the total amount, divided by the number of users.
  membershipThreshold: Value indicating how many grants a user needs in order to become a member of a group.
  permissionThresholdsH: For each permission; defines how many grants a user needs to get the permission.
  deregister( ): The sender (must be an owner) votes for the deregistration. If the OwnerThreshold( ) is reached, the contract calls deregisterOwnerContract( ), the contract account is suicided, and a refund is given to the suicideAddress.
  OwnerThreshold( ): Returns the number of current owners, divided by two.

CurrentOwnersBitmask( ): Returns the current set of owners. Iterates through owners. Specifically, for each entry i which contains an address (i.e., is not empty), 2i is added to the result.

To allow users to get or submit information from or into the owner contract the following functions may be provided by an API:

getBalance( ): Returns the user's balance at the owner contract.

addToBalance( ): Users increase their balance by submitting a transaction with some Ether attached.

subtractFromBalance(value): Users can withdraw the amount of Ether they have at their user balance.

FIG. 5 shows steps of a method according to a further embodiment of the present invention. In FIG. 5 steps of a method for controlling access to a file in a cloud are shown comprising the steps of 1) The original file owner creates a file and specifies the access control rules necessary for that file. He then translates those access control policies into a smart contract that is inserted in the blockchain.
2) The contract will decide who can/could access the files and act as an owner.
3) The contract will also specify the number of votes required to make any decision valid.
4) The owner will upload to the cloud the file and the encryption key, encrypted using some group access policy.
5) The contract will be executed by all blockchain nodes. External events will be logged into the blockchain and recorded by the smart contract.
6) New owners can only be added to the file if they match the access control policy within the smart contract. This is publicly verifiable by all blockchain nodes.
7) The cloud operates a blockchain node which performs access control decisions based on the ruling of the smart contract.
8) If an owner can be indeed added (according to the smart contract policy), the cloud will grant him the appropriate access. He will also acquire the relevant keys in order to decrypt the stored encryption key, and decrypt the file.

In summary at least one embodiment of the present invention enables or provides:

1) Relying on Turing complete smart contracts in order to enforce access control in the cloud in a distributed way by achieving consensus on all internal and external events.
2) Achieving secure storage in the shared ownership context by message passing agreeing on a group key in an oblivious way using the cloud as a message-passing channel.
3) Devising a cloud program that interfaces with the blockchain and translates smart contract decisions into access control policies.
4) Ensuring fair accounting and automatic revocation of access rights in the cloud using smart contracts.

At least one embodiment of the present invention may have at least one of the following advantages:

Embodiments of the present invention enable an enforcement of flexible access control rules in the cloud while resisting collusion among nodes without the reliance on expensive and slow cryptographic primitives. Embodiments of the present invention further enable the signature of smart contracts in the blockchain and do not block users if users are not online or available and does not require active user voting. Embodiments of the present invention further achieve high performance due to the reliance on the blockchain.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for controlling access to a shared resource for a plurality of collaborative users, the method comprising:

securely providing, on a storage and device entity, the shared resource, the shared resource being created by a resource owner entity;

specifying access control rules for the shared resource, wherein the access control rules take into account at least one external event;

translating the access control rules into a smart contract, wherein the smart contract is configured to receive, as input, external event information corresponding to the at least one external event and to specify access control decisions based at least in part on the external event information;

including the smart contract and the external event information into a blockchain; and performing, in response to a request from a user to access the shared resource, access control for the shared resource according to an access control decision specified by the smart contract.

2. The method according to claim 1, wherein the external event information is provided by a third party.

3. The method according to claim 1, wherein, for providing group access to the shared resource, a group secret between users of a defined group is generated by:

a) generating, by a first user of the group, tree-based group information as a root of an underlying tree-structure comprising nodes, b) integrating the tree-based group information into the smart contract, c) downloading a current root node, uploading tree-based group information generated by one or more subsequent users of the defined group, and generating an updated root node, and d) generating the group secret based on information of the updated root node.

4. The method according to claim 3, wherein the tree-structure is an unbalanced binary tree.

5. The method according to claim 3, wherein access permissions given to a respective node of the underlying tree-structure are also applied for all children nodes of the respective node.

6. The method according to claim 1, wherein vote information is included into the smart contract, the vote information specifying a number of votes required for making valid access decisions.

7. The method according to claim 6, wherein one or more dynamic and/or fixed thresholds for voting operations s-are specified during smart contract creation.

8. The method according to claim 1, wherein owner contracts and shared repository contracts of a cloud service entity are included into the smart contract.

9. The method according to claim 8, wherein an owner contract specifies at least user identification information and group membership information, wherein the group membership information may be provided as an array of bitmasks.

10. The method according to claim 1, wherein the smart contract is based on Role-based Access Control (RBAC).

11. The method according to claim 1, wherein the plurality of collaborative users are authenticated directly through the blockchain.

12. The method according to claim 1, wherein the at least one external event is at least one event occurring outside an underlying computational system on which the method is performed.

13. The method according to claim 12, wherein the at least one external event includes a weather condition, and the external event information is data representative of the weather condition encoded into a machine readable format.

14. The method according to claim 12, wherein the at least one external event includes a stock price, and wherein the external event information is data representative of the stock price encoded into a machine readable format.

15. The method according to claim 14, wherein the stock price is a stock price of a first company, wherein the user is an employee of the first company, and wherein performing, in response to a request from a user to access the shared resource, access control for the shared resource according to an access control decision specified by the smart contract comprises:
  providing, as input to the smart contract, an identity of the user and the data representative of the stock price encoded into the machine readable format,
  determining, by the smart contract, that the stock price of the first company has fallen below a threshold value and that the user is an employee of the first company, and
  providing, by the smart contract, a decision to deny access to the shared resource as the access control decision.

16. The method according to claim 1, wherein performing, in response to the request from the user to access the shared resource, access control for the shared resource according to the access control decision specified by the smart contract comprises:
  providing, as input to the smart contract, an identity of the user and the external event information,
  evaluating, by the smart contract, the identity of the user and the external event information, and
  providing, by the smart contract based on the evaluation of the identity of the user and the external event information, the access control decision.

17. A system for controlling access to a shared resource, the system comprising:
  a plurality of user entities configured to access the shared resource;
  a storage and service entity configured to provide the shared; and
  a blockchain entity configured to compute a blockchain,
  wherein the shared resource is created by a resource owner entity and is securely provided on the storage and service entity,
  wherein access control rules are specified for the shared resource, wherein the access control rules take into account at least one external event,
  wherein the system is configured to translate the access control rules into a smart contract, the smart contract being included into the blockchain computed by the blockchain entity, the smart contract being configured to receive, as input, external event information corresponding to the at least one external event and to specify access control decisions based at least in part on the external event information,
  wherein the external event information is further included into the blockchain computed by the blockchain entity, and
  wherein the system is configured to perform, in response to request from a user to access the shared resource, perform access control for the shared resource according to an access control decision specified by the smart contract hosted within the blockchain.

18. A blockchain computing entity, comprising:
  a processor configured to:
    compute a blockchain,
    wherein the blockchain includes a smart contract,
    wherein the smart contract includes translated access control rules,
    wherein the access control rules take into account at least one external event and specify access rights for a shared resource securely provided on a storage and service entity, and
    wherein the smart contract is configured to receive, as input, external event information corresponding to the at least one external event and to specify access control decisions based at least in part on the external event information.

19. A non-transitory computer readable medium storing a program causing a computer to execute a method for controlling access to a shared resource for a plurality of collaborative users, the method comprising:
  securely providing, on a storage and device entity, the shared resource, the shared resource being created by a resource owner entity;
  specifying access control rules for the shared resource, wherein the access control rules take into account at least one external event;
  translating the access control rules into a smart contract, wherein the smart contract is configured to receive, as input, external event information corresponding to the at least one external event and to specify access control decisions based at least in part on the external event information;
  including the smart contract and the external event information into a blockchain; and
  performing, in response to a request from a user to access shared resource, access control for the shared resource according to an access control decision specified by the smart contract.

20. A non-transitory computer readable medium storing a program causing a computer to execute a method for operating a blockchain computing processor, the method comprising:
- computing, blockchain,
- wherein the blockchain includes a smart contract,
- wherein the smart contract includes translated access control rules,
- wherein the access control rules take into account at least one external event and specify access rights for a shared resource securely provided on a storage and service entity,
- wherein the smart contract is configured to receive, as input, external event information corresponding to the at least one external event and to specify access control decisions based at least in part on the external event information.

* * * * *